(12) United States Patent
Dorenbosch

(10) Patent No.: US 6,505,049 B1
(45) Date of Patent: Jan. 7, 2003

(54) METHOD AND APPARATUS IN A COMMUNICATION NETWORK FOR FACILITATING A USE OF LOCATION-BASED APPLICATIONS

(75) Inventor: Jheroen Pieter Dorenbosch, Paradise, TX (US)

(73) Assignee: Motorola, Inc., Schaumburg, IL (US)

(*) Notice: Subject to any disclaimer, the term of this patent is extended or adjusted under 35 U.S.C. 154(b) by 404 days.

(21) Appl. No.: 09/602,977

(22) Filed: Jun. 23, 2000

(51) Int. Cl.[7] .................................................. H04Q 7/20
(52) U.S. Cl. .................. 455/456; 455/457; 340/825.36; 340/342; 340/357.1
(58) Field of Search ............................... 455/456, 457; 342/357.1, 450; 340/825.36, 988, 825.37

(56) References Cited

U.S. PATENT DOCUMENTS

| | | | |
|---|---|---|---|
| 5,581,804 A | * | 12/1996 | Cameron et al. ............ 455/456 |
| 5,905,957 A | * | 5/1999 | Olds ........................... 455/456 |
| 5,948,041 A | * | 9/1999 | Abo et al. .................... 455/456 |
| 6,181,253 B1 | * | 1/2001 | Eschenbach et al. ... 340/825.37 |
| 6,211,819 B1 | * | 4/2001 | King et al. ............... 342/357.1 |
| 6,363,255 B1 | * | 3/2002 | Kuwahara .................... 455/456 |
| 6,389,288 B1 | * | 5/2002 | Kuwahara et al. ...... 340/825.36 |
| 6,441,752 B1 | * | 8/2002 | Fomukong .................. 340/988 |

* cited by examiner

*Primary Examiner*—Thanh Cong Le
*Assistant Examiner*—Lana Le
(74) *Attorney, Agent, or Firm*—Romi L. Bose; Matthew C. Loppnow

(57) ABSTRACT

A communication network (200, 300) stores (502) location information for the communication network. A portable device (100) determines (504) whether the portable device is in motion. The portable device requests (510) the location information only when the portable device determines itself not to be in motion. The network sends (512) the location information to the portable device, in response to the request for the location information from the portable unit.

19 Claims, 4 Drawing Sheets

METHOD AND APPARATUS IN A COMMUNICATION NETWORK FOR FACILITATING A USE OF LOCATION-BASED APPLICATIONS

FIELD OF THE INVENTION

This invention relates in general to wireless communication systems, and more specifically to a method and apparatus in a communication network for facilitating a use of location-based applications for a portable device without requiring the portable device to have on-board location-determining capability.

BACKGROUND OF THE INVENTION

Location-based applications are being developed for communication devices that have on-board location-determining capability. Such devices can determine their location coordinates and report the location coordinates to a communication network, which can then provide services and information tailored to the location coordinates.

Devices that do not have on-board location-determining capability currently either cannot use location-based applications, or require a user to enter the location information manually. e.g., by entering a street address and city, or a zip code. Manual entry of location information can be problematic, especially when the user has traveled away from his home area.

Thus, what is needed is a method and apparatus in a communication network for facilitating a use of location-based applications for a portable device without requiring the portable device to have on-board location-determining capability.

DETAILED DESCRIPTION OF THE DRAWINGS

Figure 1:
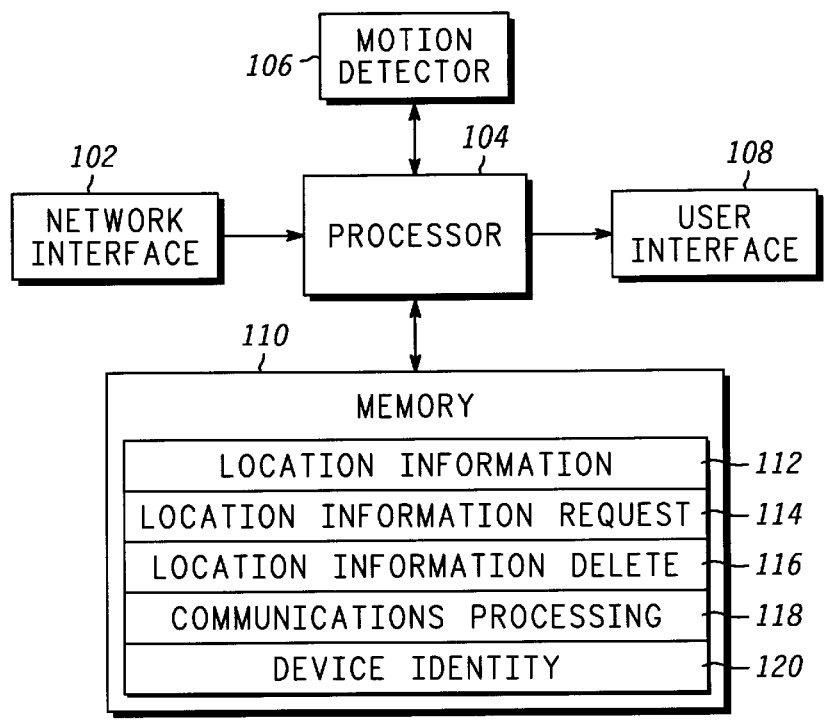
FIG. 1 is an electrical block diagram of a portable device in accordance with the present invention.

Referring to FIG. 1, an electrical block diagram depicts a portable device 100 in accordance with the present invention. The portable device can, for example, be a laptop computer. The portable device 100 comprises a network interface 102 for enabling communications with a communication network. The network interface 102 is preferably selected for compatibility with the communication network with which the portable device 100 will interconnect. When the portable device 100 will interconnect with a wired network, the network interface 102 is preferably a wired network interface, e.g., an Ethernet interface. When the portable device 100 will interconnect with a wireless network, the network interface 102 is preferably a wireless network interface, e.g., a conventional radio transceiver.

The network interface 102 is coupled to a processor 104 for processing the communications. Also coupled to the processor is a motion detector 106 for determining whether the portable device 100 is in motion. Preferably, the motion detector is a conventional Global Positioning System (GPS) receiver. It will be appreciated that another type of motion detecting device, e.g., an accelerometer, can be utilized instead for the motion detector 106. An alternative method of motion detection is to detect whether the portable device 100 is plugged into a network or power wall plug. In this case, the portable device 100 is considered stationary when plugged in, and mobile otherwise. The portable device 100 also includes a user interface 108, e.g., a conventional display and keyboard, coupled to the processor 104 for allowing a user to interface with the portable device 100.

A memory 110 is coupled to the processor 104 for storing information and software for programming the processor 104 in accordance with the present invention. The memory 110 comprises space for storing location information 112. The memory further comprises a location information request program 114 for programming the processor 104 to cooperate with the motion detector 106 and the network interface 102 to generate a request for the location information 112 from the communication network only when the portable device 100 is determined not to be in motion. The location information request program 114 is also for programming the processor 104 to cooperate further with the network interface 102 to receive the location information 112 from the communication network, in response to the request. After the processor 104 has stored the location information 112, a location information delete program 116 programs the processor 104 to later cooperate with the motion detector 106 to discover that the portable device 100 is in motion; and, in response to discovering that the portable device 100 is in motion, to delete the location information 112. The memory 110 also includes a conventional communications processing program 118 for programming the processor 104 to cooperate with the network interface 102 and the user interface 108 to provide communications between the portable device 100 and the network. The memory 110 further comprises space for a device identity 120 for identifying the portable device 100 to the network. Operation of the portable device 100 in accordance with the present invention will be described further herein below.

Figure 2:
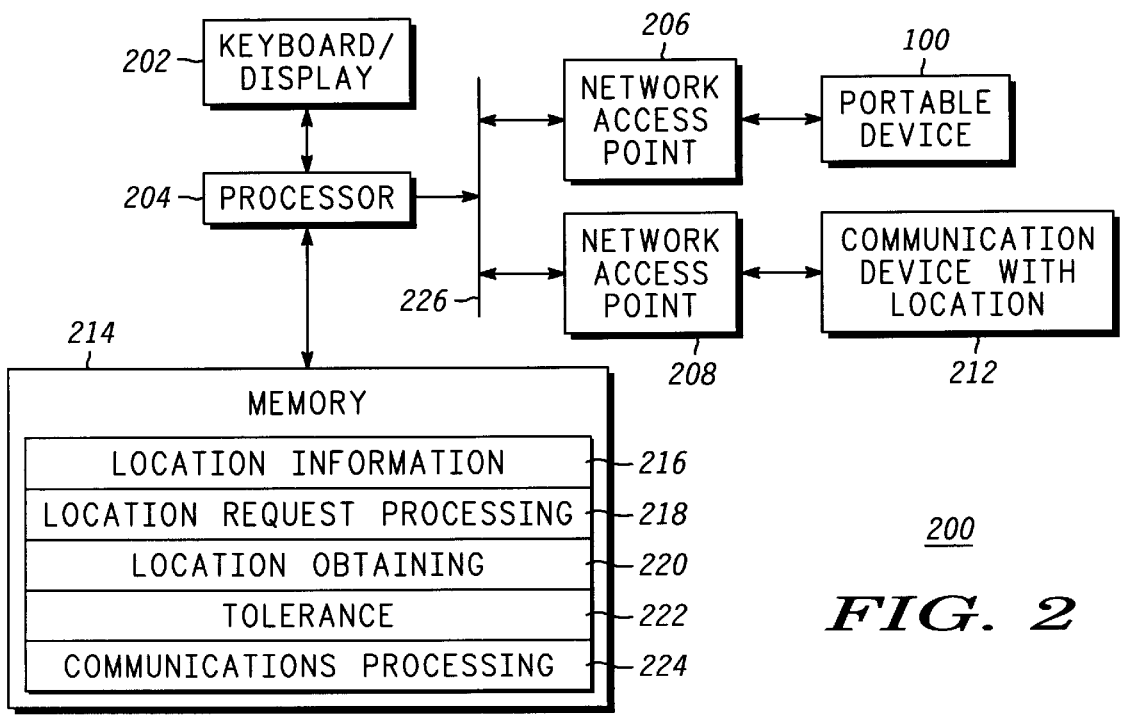
FIG. 2 is an electrical block diagram of a wired communication network in accordance with the present invention.

Referring to FIG. 2, an electrical block diagram depicts a wired communication network 200 in accordance with the present invention. The wired communication network 200 comprises the portable device 100, coupled to a first network access point 206. The first network access point 206 is coupled to the network backbone 226. A second network access point 208 is also coupled to the network backbone 226 and provides network access for a conventional communication device 212 with on-board location-determining capability, e.g., a Wireless Access Protocol (WAP) enabled mobile telephone with built-in GPS. Also coupled to the network backbone 226 is a processor 204 for processing the communications of the network 200 and for controlling the network 200. The processor 204 is coupled to a conventional keyboard/display 202 for providing control and programming of the processor 204 by an operator. Alternatively, the network controller can be a network router or bridge that is remotely controlled and does not have its own keyboard. The processor 204 is further coupled to a memory 214 for storing information and software in accordance with the present invention. The memory 214 comprises space for location information 216, and a location request processing program 218 programs the processor 204 to send the location information 216 to the portable device 100 when requested. In one embodiment, the location information 216 comprises manually entered location coordinates of the communication network. The location information 216 preferably includes location coordinates for each of the access points 206, 208 of the system, and the processor 204 sends the location coordinates of the access point 206 used by the portable device for accessing the network 200. In another embodiment, the location information comprises only the location coordinates of a central portion of the network 200, and the processor 204 sends the location coordinates of the central portion of the network 200, along with a tolerance 222 determined by the geographic size of the communication network.

In yet another embodiment, the memory 214 includes a location obtaining program 220 for programming the processor 204 to cooperate with the network access point 208 to provide access to the communication network by the communication device 212, which has on-board location-determining capability; to request location coordinates of the communication device 212; to receive the location coordinates from the communication device 212; and to store the location coordinates in the memory 214 as the location information 216. The memory 214 also includes a conventional communications processing program 224 for processing the communications of the network 200.

Figure 3:
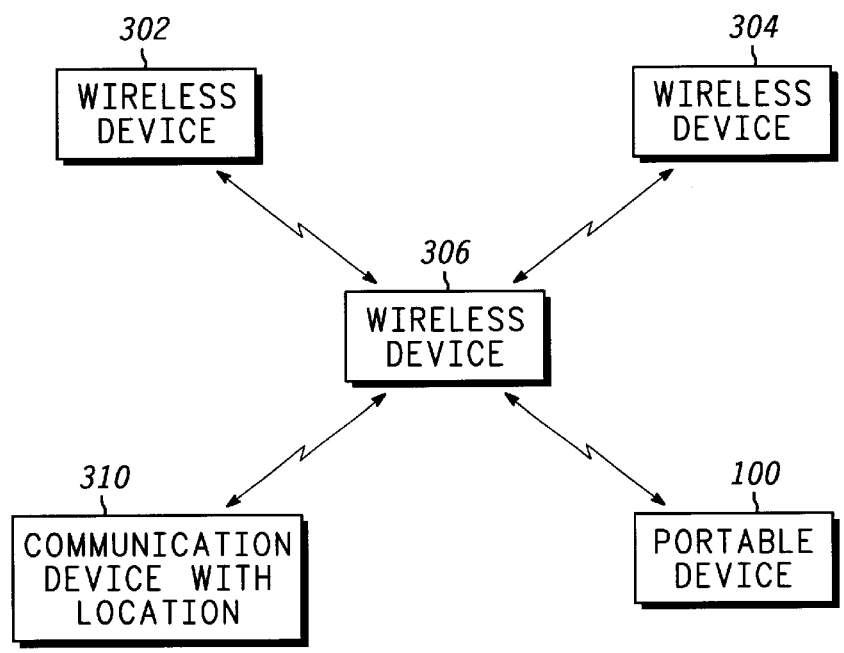
FIG. 3 is an electrical block diagram of a wireless communication network in accordance with the present invention.

Referring to FIG. 3, an electrical block diagram depicts a wireless communication network 300 in accordance with the present invention. The wireless communication network 300 comprises a plurality of wireless devices 302, 304, 306, which have formed an ad hoc network, for which the wireless device 306 is currently the master. Also in the network 300 is the portable device 100 and a communication device 310 with on-board location-determining capability. The network 300 operates in accordance with a well-known ad hoc networking specification, such as Bluetooth. Operation of the wireless communication network in accordance with the present invention will be described further herein below.

Figure 4:
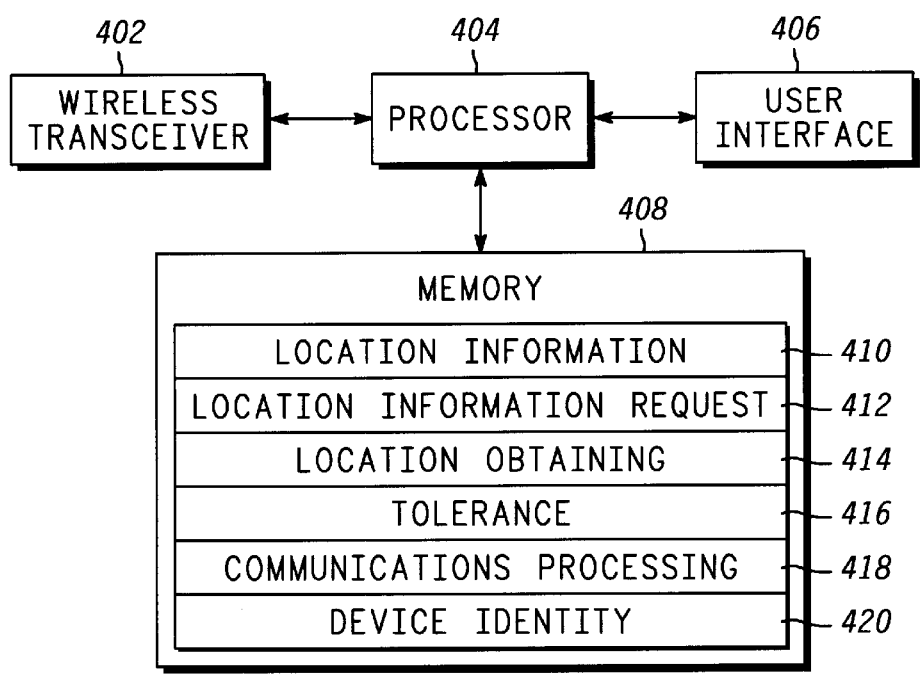
FIG. 4 is an electrical block diagram of a wireless device in accordance with the present invention.

Referring to FIG. 4, an electrical block diagram depicts the wireless device 302, which preferably is identical to the wireless devices 304 and 306. The wireless device 302 comprises a wireless transceiver 402 for communicating wirelessly with other similar wireless devices. The wireless device 302 further comprises a processor 404 coupled to the wireless transceiver 402 for controlling the wireless transceiver 402. The processor 404 is also coupled to a user interface 406 comprising a conventional display and keypad for interfacing with a user. The wireless device 302 further comprises a memory 408 coupled to the processor 404 for storing information and software for programming the processor 404 in accordance with the present invention. The memory 408 includes space for storing location information 410. After the wireless device 302 establishes communications with the communication device 310 which has on-board location determining capability, a location obtaining program 414 programs the processor 404 to cooperate with the wireless transceiver 402 to request, from the communication device 310, location coordinates of the communication device 310; to receive the location coordinates; and to store the location coordinates in the memory 408 as the location information 410. The location obtaining program 414 further programs the processor 404 to cooperate with the memory 408 to store a tolerance 416 along with the location coordinates, the tolerance 416 derived from a maximum transmission range between the communication device 310 and the wireless transceiver 402. In addition, the memory comprises a location information request program for programming the processor 404 to cooperate with the wireless transceiver 402 to send the tolerance 416 along with the location coordinates to the portable device 100, in response to receiving a request from the portable device 100 for the location information 410. The memory 408 also includes a communications processing program 418 for programming the processor to process communications in accordance with the ad hoc networking specification used in the network 300. Also included is a device identity 420 for uniquely identifying the wireless device 302.

Figure 5:
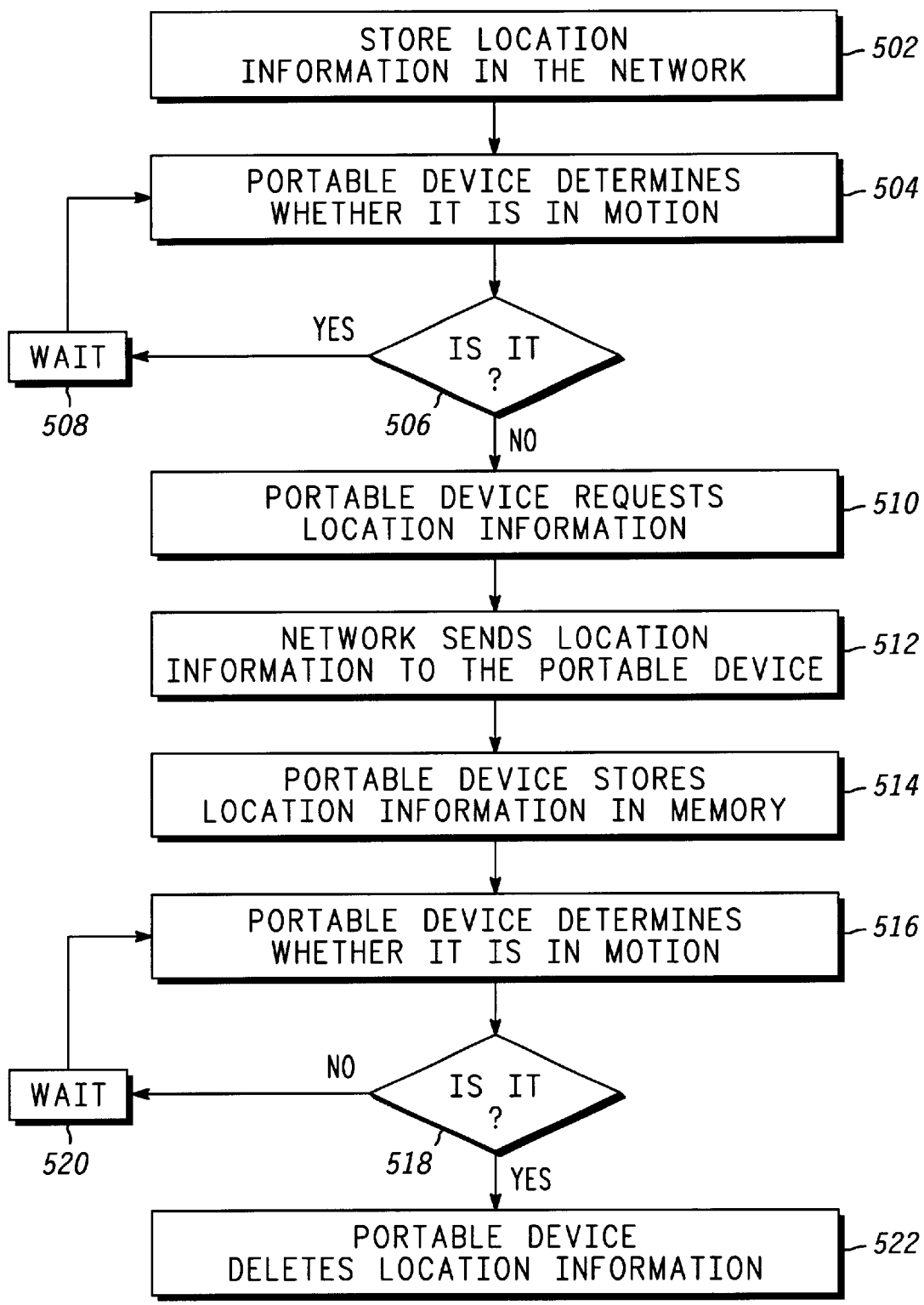
FIGS. 5–7 are flow diagrams depicting operation of the wired and wireless communication networks in accordance with the present invention.
Figure 6:
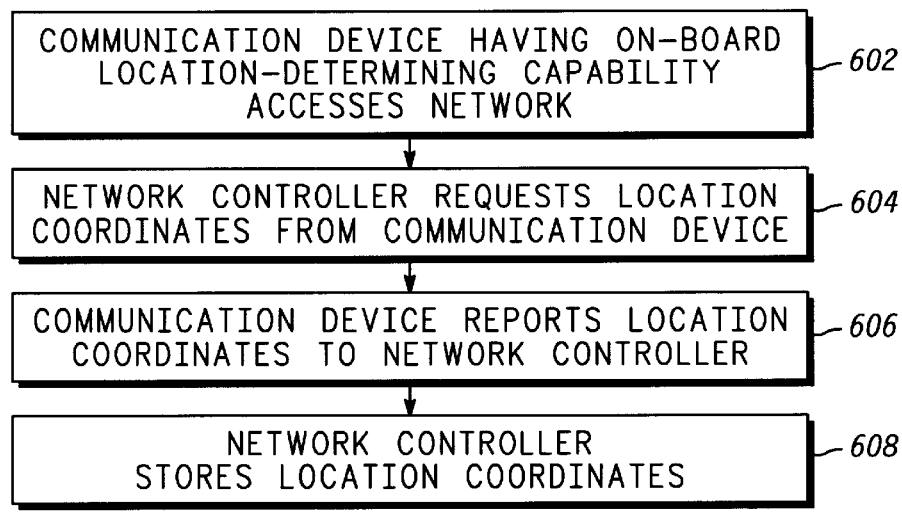
Figure 7:
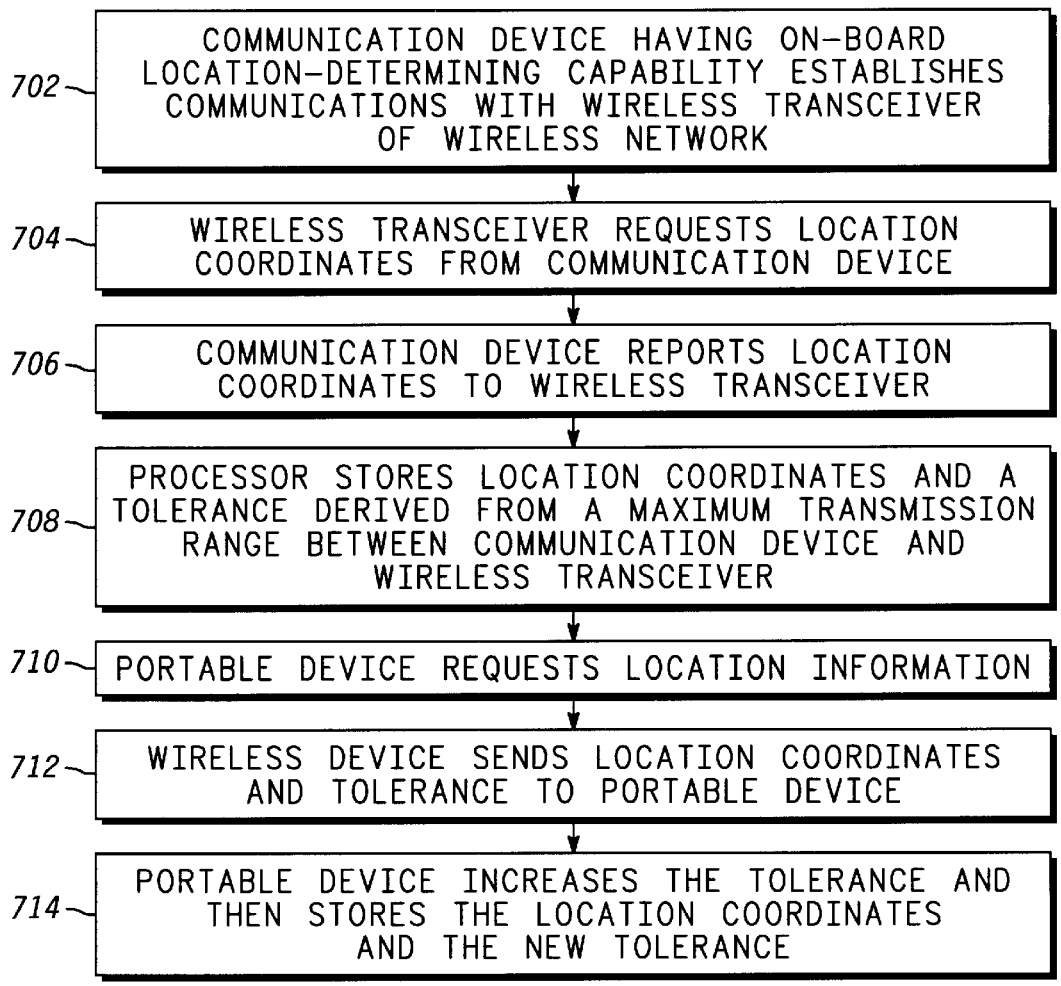

Referring to FIGS. 5–7, flow diagrams 500, 600, and 700 depict operation of the wired and wireless communication networks 200, 300 in accordance with the present invention. The flow diagram 500 describes interactions between the network 200, 300 and the portable device 100, which does not have on-board location-determining capability. The diagram 500 begins with storing 502 location information in the network. In one embodiment, the location coordinates of the network 200, 300 are manually entered and stored in a fixed element of the network, e.g., in the memory 214. Alternatively, the location coordinates of the plurality of network access points 206, 208 can be stored in the memory 214. The portable device 100 then determines 504 from the motion detector 106 whether the portable device is in motion. "In motion" can, for example, be defined as having moved more than a predetermined distance, e.g., five meters, in a predetermined time, e.g., one minute. If the portable device 100 is in motion, at step 506 the flow moves to step 508, where the portable device 100 waits 508 for a predetermined time, e.g., one minute, and then returns to step 504 to check for motion.

If, on the other hand, the portable device 100 is not in motion, at step 506 the flow moves to step 510, where the portable device 100 requests location information from the network 200, 300. In response, the network 200, 300 sends 512 the location information to the portable device 100. In one embodiment, when the network is a wired network 200, the network 200 sends location coordinates of a central portion of the communication network 200, along with a tolerance determined by a geographic size of the communication network 200. For example, if the network is one hundred meters long, the tolerance would be fifty meters (plus or minus). In another embodiment, the network 200 sends to the portable device 100 the location coordinates of one of the plurality of network access points 206, 208 utilized by the portable device 100 for accessing the communication network 200.

The portable device 100 then stores 514 the location information in the memory 110. The portable device 100 then determines 516 whether it is in motion. If not, the portable device waits 520 for the predetermined time, and then returns to step 516 to again check for motion. If the portable device 100 is in motion, at step 518 the flow moves to step 522, where the portable device 100 deletes the location information, or marks the location information as being "stale."

In the manner described herein above, the portable device 100, which does not have on-board location-determining capability, advantageously can use location-based applications by obtaining location information from the network 200, 300. Also advantageously, the portable device 100 does not attempt to obtain the location information when the portable device 100 is in motion, but waits until it is not in motion.

In addition, the portable device 100 deletes the location information when the portable device 100 is again in motion.

The flow diagram 600 depicts a technique by which the wired network 200 can learn information about its own location from the communication device 212, which has on-board location-determining capability, such as GPS. The flow begins with the communication device 212 accessing 602 the network 200 through well-known techniques via one of the network access points 206, 208. The processor 204 (network controller) then requests 604 the location coordinates of the communication device 212. In response, the communication device reports 606 its location coordinates to the processor 204. The processor 204 then stores the location coordinates in the memory 214. In this manner, the processor 204 advantageously can, over time, determine and store the location coordinates of each of the plurality of network access points 206, 208. Alternatively, the processor 204 can determine the network's central location and geographic size.

The flow diagram 700 depicts a method by which wireless units can exchange location information. The flow begins with a communication device 310 having on-board location-determining capability establishes 702 wireless communications with the wireless transceiver 402 of the wireless device 306 of the network 300 through well-known techniques. In response, the processor 404 controls the wireless transceiver 402 to request 704 the location coordinates from the communication device 310. In response to the request, the communication device 310 reports 706 its location coordinates to the wireless 110 transceiver 402. The processor 404 then stores 708 in the memory 408 the location coordinates and a tolerance derived from a maximum transmission range between the communication device 310 and the wireless transceiver 402. For example, if the maximum transmission range is ten meters, the tolerance is ten meters (plus or minus).

Later, the portable device 100 accesses the wireless network 300 and requests 710 location information. In response, the wireless device 306 sends 712 the location coordinates and the tolerance to the portable device 100. At step 714, the portable device 100 increases the tolerance, e.g., by the maximum transmission range between the portable device 100 and the wireless device 306, and then stores the location coordinates and the new tolerance in the memory 408. In this manner, possible error accumulation in location coordinates resulting from position displacements among the wireless units advantageously can be taken into consideration.

It should be clear from the preceding disclosure that the present invention provides a method and apparatus in a communication network for facilitating a use of location-based applications for a portable device without requiring the portable device to have on-board location-determining capability. Advantageously, the present invention allows location information to be passed among the devices utilizing the communication network in an intelligent manner that provides an indication of possible error accumulation when location coordinates are passed multiple times.

Many modifications and variations of the present invention are possible in light of the above teachings. Thus, it is to be understood that, within the scope of the appended claims, the invention can be practiced other than as specifically described herein above.

What is claimed is:

1. A method in a communication network for facilitating a use of location-based applications for a portable device without requiring the portable device to have on-board location-determining capability, the method comprising the steps of:

storing location information for the portable device in the communication network;

determining by the portable device whether the portable device is in motion;

requesting, by the portable device, the location information only when the portable device is determined not to be in motion; and sending the location information from the communication network to the portable device, in response to the requesting step.

2. The method of claim 1, further comprising the steps of:

storing the location information in the portable device;

later discovering that the portable device is in motion; and in response to the discovering step, performing one of:
deleting the location information, and
marking the location information as "stale."

3. The method of claim 1, wherein the storing step comprises the step of manually entering location coordinates of the communication network.

4. The method of claim 1, wherein the communication network is a wired communication network, and wherein the storing step comprises the steps of:
accessing the communication network through a network access point by a communication device which has on-board location-determining capability;
requesting, from the communication device by a controller of the communication network, location coordinates of the communication device; and
reporting the location coordinates to the controller by the communication device.

5. The method of claim 1, wherein the sending step comprises the step of sending location coordinates of a central portion of the communication network, along with a tolerance determined by a geographic size of the communication network.

6. The method of claim 1, wherein the storing step comprises the step of storing location coordinates of a plurality of network access points in the communication network, and wherein the sending step comprises the step of sending the location coordinates of one of the plurality of network access points utilized by the portable device for accessing the communication network.

7. The method of claim 1, wherein the communication network is a wireless network, and wherein the storing step comprises the steps of:
establishing communications with a wireless device of the wireless network by a communication device which has on-board location determining capability;
requesting, from the communication device by the wireless device, location coordinates of the communication device;
receiving the location coordinates at the wireless device; and
storing the location coordinates in the wireless device.

8. The method of claim 7, wherein the step of storing the location coordinates further comprises the step of storing a tolerance along with the location coordinates, the tolerance derived from a maximum transmission range between the communication device and the wireless device.

9. The method of claim 8, wherein the sending step further comprises the step of sending the tolerance along with the location coordinates to the portable device.

10. The method of claim 9, wherein a first device that has received the location coordinates and the tolerance from a second device increases the tolerance before storing the location coordinates and the tolerance.

11. A portable device in a communication network having an intelligent element for storing and providing location information for the communication network, the portable device for facilitating a use of location-based applications for the portable device without requiring the portable device to have on-board location-determining capability, the portable device comprising:

a network interface for enabling communications with the communication network;

a processor coupled to the network interface for processing the communications;

a memory coupled to the processor for storing the location information; and a motion detector coupled to the processor for determining whether the portable device is in motion wherein the processor is programmed to:

cooperate with the motion detector and the network interface to generate a request for the location information from the communication network only when the portable device is determined not to be in motion; and cooperate further with the network interface to receive the location information from the communication network, in response to the request.

12. The portable device of claim 11, wherein the processor is further programmed to:

store the location information in the memory;

later cooperate with the motion detector to discover that the portable device is in motion; and in response to discovering that the portable device is in motion, perform one of:

deleting the location information, and marking the location information as "stale."

13. A communication network for storing and providing location information for facilitating a use of location-based applications for a portable device without requiring the portable device to have on-board location-determining capability, the communication network comprising:

a network access point for allowing communications between the communication network and the portable device;

a processor coupled to the network access point for processing the communications; and a memory coupled to the processor for storing the location information; wherein the processor is programmed to:

cooperate with the network access point to receive a request for the location information from the portable device when the portable device is not in motion; and cooperate further with the network access point and the memory to send the location information to the portable device, in response to the request.

14. The communication network of claim 13, wherein the communication network is a wired communication network, and wherein the processor is further programmed to cooperate with the network access point to:

provide access to the communication network by a communication device which has on-board location-determining capability;

request location coordinates of the communication device;

receive the location coordinates from the communication device; and store the location coordinates in the memory.

15. The communication network of claim 13, wherein the processor is further programmed to cooperate with the network access point to send, to the portable device, location coordinates of a central portion of the communication network, along with a tolerance determined by a geographic size of the communication network.

16. The communication network of claim 13, wherein the processor is further programmed to cooperate with the network access point to:

store location coordinates of a plurality of network access points in the memory, and send to the portable device the location coordinates of one of the plurality of network access points utilized by the portable device for accessing the communication network.

17. The communication network of claim 13, wherein the network access point is a wireless transceiver, and wherein the processor is further programmed to cooperate with the wireless transceiver and the memory to:

establish communications with a communication device which has on-board location determining capability;

request, from the communication device, location coordinates of the communication device;

receive the location coordinates; and store the location coordinates in the memory.

18. The communication network of claim 17, wherein the processor is further programmed to cooperate with the memory to store a tolerance along with the location coordinates, the tolerance derived from a maximum transmission range between the communication device and the wireless transceiver.

19. The communication network of claim 18, wherein the processor is further programmed to cooperate with the wireless transceiver to send the tolerance along with the location coordinates to the portable device.

* * * * *